May 20, 1958 R. F. COOK, JR 2,835,031
ELECTRIC CABLE INSULATION CUTTER
Filed Oct. 29, 1956
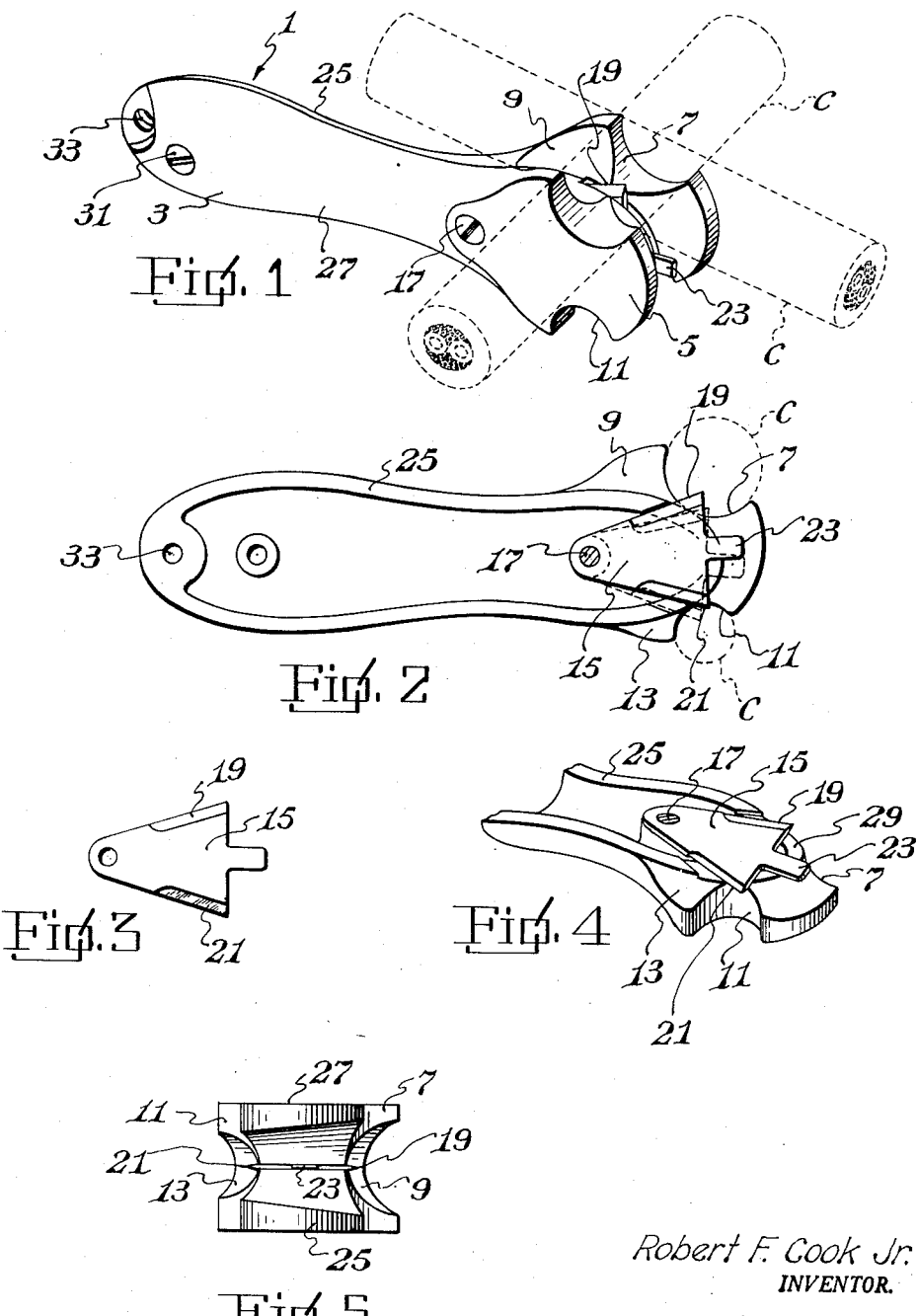
Robert F. Cook Jr.
INVENTOR.

United States Patent Office 2,835,031
Patented May 20, 1958

2,835,031
ELECTRIC CABLE INSULATION CUTTER
Robert F. Cook, Jr., Tulsa, Okla.

Application October 29, 1956, Serial No. 618,756

3 Claims. (Cl. 30—91)

The present invention relates to electric cable insulation cutters, and particularly to implements adapted to slit the rubber or plastic covering on the end of an electric cable so that the insulation may be removed and the inner insulated wires exposed for splicing.

It is an object of the present invention to provide an implement for cutting electric cable insulation, adapted to cut the insulation both peripherally and longitudinally.

Another object of the invention is the provision of an implement for cutting electric cable insulation, adapted for use on cables of substantially different sizes.

A still further object of the invention is the provision of an implement for cutting electric cable insulation, in which the depth of cut may be adjusted.

Finally, the invention contemplates the provision of an implement for cutting electric cable insulation, which will be relatively inexpensive to manufacture, quick and easy to adjust and operate, and rugged and durable in use.

Other objects and advantages of the present invention will become aparent from a consideration of the following description, taken in conjunction with the accompanying drawing, in which:

Figure 1 is a perspective view of an implement according to the invention, with sections of cable shown in phantom in operative position;

Figure 2 is an elevational view of a separable half of an implement according to my invention, showing the mounting and adjustment and operation of the cutting blade;

Figure 3 is an elevational view of the cutting blade itself;

Figure 4 is a perspective view of an end portion of the separable half shown in Figure 2; and Figure 5 is an end view, taken from the cutting end, of an implement according to my invention.

Referring now to the drawings in greater detail, there is shown an implement for cutting electric cable insulation, indicated generally at 1, and comprising a support providing a handle 3 at one end thereof. The other end of implement 1 comprises a support portion 5 having therein a first pair of partial cylindrical recesses 7 and 9, intersecting each other, and having axes which intersect each other at right angles. The radii of curvature of recesses 7 and 9 are equal; and these recesses provide cradles for a cable C during the cutting process to be described later, first in one position and then in a position at right angles to its former position.

A second pair of partial cylindrical recesses 11 and 13 is provided on the other side of support portion 5. Recesses 11 and 13 are related to each other the same as recesses 7 and 9; that is to say, they intersect each other, their axes intersect each other at right angles, and their radii of curvature are equal. The axis of recess 7 is parallel to the axis of recess 11, and the axis of recess 9 is parallel to the axis of recess 13. However, the common radius of curvature of recesses 7 and 9 is substantially different from that of recesses 11 and 13, for the purpose of accommodating different sizes of cable. A larger cable can be accommodated in recesses 7 and 9, and a smaller cable can be accommodated in recesses 11 and 13. Figure 2 shows the disposition of a larger cable C in recess 7 and a smaller cable C' in recess 11.

A flat cutting blade 15 is mounted for limited pivotal movement in its own plane about an axis disposed on the handle side of recesses 7, 9, 11 and 13, this pivotal axis being defined by a screw-threaded fastening element 17 passing through a hole in an apex of generally triangular blade 15. The plane of blade 15 includes the axes of recesses 9 and 13 and is perpendicular to the axes of recesses 7 and 11. The axis of pivotal movement of blade 15 is parallel to the axes of recesses 7 and 11. It will be seen in Figure 2 that blade 15 extends into all of recesses 7, 9, 11 and 13; and that pivotal movement of blade 15 moves it closer to or farther from the respective axes of these recesses.

Blade 15 is provided with a pair of cutting edges 19 and 21 on either side thereof. Edge 19 extends into recesses 7 and 9; and edge 21 extends into recesses 11 and 13. Edges 19 and 21 converge toward the axis of pivotal movement of blade 15. Blade 15 is provided with an integral adjustment lug 23 extending radially outwardly therefrom relative to the axis of pivotal movement of the blade and disposed between edges 19 and 21, for the purpose of giving purchase on the blade during adjustment.

Implement 1, and therefore support portion 5, is comprised of a pair of separable complementary halves 25 and 27, which are mirror-image likenesses of each other except for the screw holes for holding them together. For the purpose of accommodating blade 15 between them, halves 25 and 27 are provided with opposed shallow recesses as at 29, each having a depth slightly less than half the thickness of blade 15 and each having converging end walls directed toward the pivotal axis of blade 15 and defining between these end walls an angle greater than the angle between cutting edges 19 and 21, to restrain excessive pivotal movement of blade 15. As best seen in Figure 2, lug 23 extends radially beyond recesses 29 relative to the pivotal axis of blade 15 to provide adjustment purchase, but is still sheltered within the outer contour of support portion 5 to avoid inadvertent displacement of blade 15. Fastening element 17 passes through half 27 and through blade 15 and engages in a complementary screw-threaded recess (not shown) in half 25. It will therefore be apparent that when fastening element 17 is tightened, halves 25 and 27 will be drawn together and will clamp between them blade 15 in any of a plurality of positions of adjustment about the pivotal axis of blade 15.

The other or handle end of halves 25 and 27 is separably held together by a screw 31 passing through both; and implement 1 may be suspended by a ring or snap passing through hole 33 in the extreme end of the handle.

In operation, fastening element 17 is loosened and blade 15 pivotally adjusted by manipulation of lug 23 to adjust the desired depth of cut. Fastening element 17 is then tightened to clamp blade 15 in recesses 29 between halves 25 and 27. Assuming that recesses 7 and 9 are to be used, a cable C is laid in the cradle formed by recess 7 and implement 1 and cable C are rotated relative to each other about the axis of recess 7. Obviously, implement 1 may be held stationary and cable C rotated about its axis, or cable C may be held stationary and implement 1 rotated about the axis of recess 7, or both. In any event, the result is to cut the outer insulation peripherally of the cable.

Next, the positions of the implement and cable are shifted 90 degrees relative to each other so that cable C rests in the trough provided by recess 9, with cutting edge 19 disposed at the first cut and handle 3 extending in the direction of the end of the cable. The implement and the cable are then moved endwise relative to each other, the cable sliding through recess 9 away from handle 3, so that a cut in the insulation is made which extends longitudinally from the previous cut to the end of the cable. By the formation of these two cuts, a cylindrical sheath of insulation at the end of the cable is cut free and may be pulled off to expose wires for splicing. It should be noted that cutting edge 19 is so disposed that the implement may always be drawn toward the operator and need never be pushed away from the operator in use.

If a substantially smaller cable is to be stripped, such as cable C′, then recesses 11 and 13 are used and adjustment of blade 15 is made with reference to cutting edge 21. Otherwise, the operation of the device is the same as before.

From a consideration of the foregoing, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An implement for cutting electric cable insulation, comprising a flat cutting blade mounted on a support providing a handle, said support having a pair of partial cylindrical recesses therein of equal radii of curvature, said recesses intersecting each other and having axes which intersect each other at right angles, said blade extending into both said recesses, the plane of said blade including the axis of one said recess and being perpendicular to the axis of the other said recess.

2. The invention of claim 1, said blade being mounted for pivotal movement in its said plane, and means for locking said blade in any of a plurality of positions of adjustment to regulate the depth of cut.

3. The invention of claim 2, said support comprising a pair of separable complementary halves between which said blade is disposed, and said means comprising a fastening element passing through said blade and engaging both said halves to releasably clamp said blade between said halves.

References Cited in the file of this patent

UNITED STATES PATENTS

| | | |
|---|---|---|
| 1,157,214 | Genin | Oct. 19, 1915 |
| 1,739,972 | Klinger | Dec. 17, 1929 |
| 2,187,215 | Spinello | Jan. 16, 1940 |
| 2,220,631 | Yagel | Nov. 5, 1940 |
| 2,329,805 | Wilson, F. G. | Sept. 21, 1943 |
| 2,373,868 | Wilson, W. A. | Apr. 17, 1945 |
| 2,421,049 | Bell | May 27, 1947 |

FOREIGN PATENTS

| | | |
|---|---|---|
| 704,488 | Great Britain | Feb. 24, 1954 |